United States Patent
Khalfin et al.

(10) Patent No.: US 6,369,564 B1
(45) Date of Patent: Apr. 9, 2002

(54) ELECTROMAGNETIC POSITION AND ORIENTATION TRACKING SYSTEM WITH DISTORTION COMPENSATION EMPLOYING WIRELESS SENSORS

(75) Inventors: Igor Khalfin, South Burlington; Herbert S. Jones, Jr., Williston, both of VT (US)

(73) Assignee: Polhemus, Inc., Colchester, VT (US)

( * ) Notice: Subject to any disclaimer, the term of this patent is extended or adjusted under 35 U.S.C. 154(b) by 0 days.

(21) Appl. No.: 09/755,303

(22) Filed: Jan. 3, 2001

Related U.S. Application Data (63) Continuation-in-part of application No. 09/430,978, filed on Nov. 1, 1999.
(60) Provisional application No. 60/184,892, filed on Feb. 25, 2000.

(51) Int. Cl.$^7$ .................................................. G01B 7/14
(52) U.S. Cl. ............................ 324/207.17; 324/207.12; 702/150
(58) Field of Search ........................ 324/207.11, 207.12, 324/207.14–207.17, 207.26, 228, 236, 239, 243; 600/424, 407, 409, 587, 595; 702/150, 152, 153

(56) References Cited

U.S. PATENT DOCUMENTS

| | | | |
|---|---|---|---|
| 5,640,170 A | 6/1997 | Anderson | 343/895 |
| 5,645,077 A | 7/1997 | Foxlin | 128/774 |
| 5,831,260 A | 11/1998 | Hansen | 250/221 |
| 6,147,480 A | 11/2000 | Osadchy et al. | 324/67 |
| 6,148,280 A | 11/2000 | Kramer | 703/153 |

FOREIGN PATENT DOCUMENTS

EP 1034738 A1 9/2000

OTHER PUBLICATIONS

J. Malpeli, "Measuring eye position with the double magnetic induction method," Journal of Neuroscience Methods 86 (1998) pp. 55–61.

Primary Examiner—Jay Patidar
(74) Attorney, Agent, or Firm—Gifford, Krass, Groh, Sprinkle, Anderson & Citkowski, PC (57) ABSTRACT

A solution to the electromagnetic position/orientation tracking problem is presented in an environment wherein strong electromagnetic distortion may be present includes at least one source of an AC electromagnetic field, at least one witness sensor measuring components of the electromagnetic induction vector at known spatial points close to, or within the volume of interest, at least one wireless probe sensor placed on the object being tracked, and a control and processing unit. The wireless sensor has a known response or distortion to the electromagnetic field generated by the primary source. The control/processing unit uses data from the witness sensor(s) to locate the probe sensor, treating the probe sensor as a secondary source of the AC electromagnetic field; that is, as a transponder with initially known magnetic parameters. This information is utilized by a position and orientation algorithm executed by the control/processing unit to define coordinates and attitude of the secondary source and, in turn, the position and orientation H of the object of interest. In the preferred embodiment, the probe sensor is an LC-contour tuned to the frequency of the tracker source. As such, the signal from the probe sensor is 90° phase shifted with respect to the tracker source signal and other signals in the system, including distortion. This allows the witness sensors and processing unit to separate the environmental distortion signal from the probe sensor signal by distinguishing the phase of the signal from the probe sensor.

26 Claims, 6 Drawing Sheets

ELECTROMAGNETIC POSITION AND ORIENTATION TRACKING SYSTEM WITH DISTORTION COMPENSATION EMPLOYING WIRELESS SENSORS

REFERENCE TO RELATED APPLICATION

This application claims priority from U.S. provisional application Ser. No. 60/184,892, filed Feb. 25, 2000, and is a continuation-in-part of U.S. patent application Ser. No. 09/430,978, filed Nov. 1, 1999, the entire contents of each application being incorporated herein by reference.

FIELD OF THE INVENTION

This invention relates generally to position/orientation tracking and, in particular, to methods and apparatus for accurate position, orientation and movement tracking within a volume in the presence of electromagnetic distortion and noise.

BACKGROUND OF THE INVENTION

Existing electromagnetic tracking systems, as well as inertial and combined inertial/optical and optical/magnetic tracers, are sensitive to various kinds of distortion. With respect to electromagnetic trackers, such distortion may arise from eddy currents in metal objects, whereas, in the case of inertial trackers, drift or vibration might be the cause.

Inertial tracking systems, as described in U.S. Pat. No. 5,645,077, requires an additional sensor, or set of sensors, to compensate for drift and movement of a vehicle or aircraft reference frame. Even with these additional sensors, such systems exhibit sensitivity to vibration and temperature instability requiring additional compensation. Inertial tracking systems also experience drift over time periods on the order of minutes to hours.

Combination systems, that is, systems which combine optical and inertial or optical and magnetic sensing, are designed to compensate for distortion by comparison of the data from two different types of sensors. One such system is described in U.S. Pat. No. 5,831,260 to Hansen. These approaches are restricted to applications such as interference associated with night-vision devices, and are still affected by distortion, especially when parasitic illumination or optical noise is present. Another system is described in U.S. Pat. No. 6,148,280 to Kramer. This system employs two different kinds of sensors—on of them is slow, but accurate, another is fast, but less accurate, e. g. optical and inertial sensors. While such a system allows performing tracking with sufficient accuracy and high update rate, it still has the same problems as one referred to above. The system described in European Patent Application No. EP 1 034 738 Al to Govary employs RF illumination of the probe sensor/transducer that emits ultrasound energy at the frequency responsive to an interaction with the RF electromagnetic field. Detectors in a vicinity of the object measure the energy response and the system utilizes this information to compute position of the probe sensor. Such a system allows to use wireless sensor/transducer but have no tools to compensate for distortion and scattering of RF and ultrasound waves.

In an AC electromagnetic tracking environment, distortion may arise from eddy currents induced in nearby metal objects. These currents may, in turn, generate stray fields, which interfere with the field from the source(s) used for tracking purposes. The system described in U.S. Pat. No. 6,147,480 to Osadchy and Govari utilizes the field form eddy currents generated in a metal tool to determine the position of this tool, given that the field from eddy currents is phase shifted with respect to the field from the source. This system is able to find the position of a metal object, but suffering from the distortion grom the surrounding metal and unable to distinguish uniquely multiple objects present in the volume of interest simultaneously. To compensate for the electromagnetic distortion, one solution involves the use of mapping. With mapping, the electromagnetic field in a volume of interest, as distorted by metal objects, is defined in advance and used to solve for position and orientation. Commonly assigned U.S. patent application Ser. No. 09/215,052 describes such a mapping system.

In commonly assigned U.S. patent application Ser. No. 09/430,978, a system for electromagnetic position and orientation tracking is disclosed wherein distortion parameters are computed using data from witness sensors. Each witness sensor has a fixed position and orientation near or within the volume to account for the distortion. One or more probe sensors are placed on an object (or multiple objects) to be tracked within the volume, and the output of each witness sensor is used to compute the parameters of a non-real effective electromagnetic source. The parameters of the effective source are used as inputs to the computation of position and orientation as measured by each probe sensor, as if the object were in the non-distorted electromagnetic field produced by the effective source.

In commonly assigned U.S. Pat. No. 5,640,170, a source is used to generate a plurality of electromagnetic fields which are distinguishable from one another, and a remote sensor has a plurality of field-sensing elements which sense each of the generated electromagnetic fields. A processor processes the output of the sensor in a remote object position and orientation relative to the source reference coordinate frame. At least one of the field-generating elements of the source has at least one electrically conductive sheet and a planar coil including a plurality of coplanar concentric rings above the conductive sheet. The planar coil is configured in a manner that a signal applied to that coil causes a current density at each ring that is inversely proportional to the square of the radius of that ring. Although the source is considered to be a distortion stable source, the resulting tracker is limited to shielding distortion in only one hemisphere.

A wireless, eyeball motion tracking system is disclosed in J. Neurosci. Methods (Netherlands), V.86, No. 1, pp. 55–61 (1998), Malpeli J. G. The system operates by detecting the signal induced in a metal ring placed on the eye. This method is not a full-scale electromagnetic position and orientation tracker and, as described, is not distortion stable.

The need remains, therefore, for a simple but effective approach to reducing the effects of distortion in an electromagnetic tracking system. Ideally, such a solution would be useful in a variety of applications, including military, motion capture and medical instrumentation.

SUMMARY OF THE INVENTION

This invention provides a new technology and accompanying method for an electromagnetic position/orientation tracking in an environment wherein strong electromagnetic distortion may be present. In terms of apparatus, the system includes at least one source of an AC electromagnetic field, at least one witness sensor measuring components of the electromagnetic induction vector at known spatial points close to, or within the volume of interest, at least one wireless probe sensor placed on the object being tracked, and a control and processing unit.

The wireless sensor has a known response or distortion to the AC electromagnetic field generated by the primary source. The control/processing unit uses data from the witness sensor(s) to locate the probe sensor, treating the probe sensor as a secondary source of the AC electromagnetic field; that is, as transponder, a source with initially known magnetic parameters. This information is utilized by a position and orientation algorithm executed by the control/processing unit to define coordinates and attitude of the secondary source and, in turn the position and orientation of the object of interest.

In the preferred embodiment, the probe sensor is an LC-contour ring tuned to the frequency of the tracker source. As such, the signal from the probe sensor is 90° phase shifted with respect to the signal from the tracker source, and, correspondingly phase shifted with respect to distortion. This allows the witness sensors and processor to separate the environmental distortion signal and the source signal from the probe sensor signal. The higher the Q, and the more accurate the tuning of the probe sensor, the higher the stability to the distortion.

In terms of methodology, initial measurements and computations are preferably performed before the known distorter/probe sensor has been introduced into the volume of interest, or at the frequency close but not equal to the resonant frequency of the probe sensor thereby providing a background profile of the field. The measurements are then repeated in real time, or quasi-real time in the presence of the probe sensor. The difference between initial and ongoing solution is completely determined by the position and orientation of the probe sensor working as a known distorter.

Figure 6:
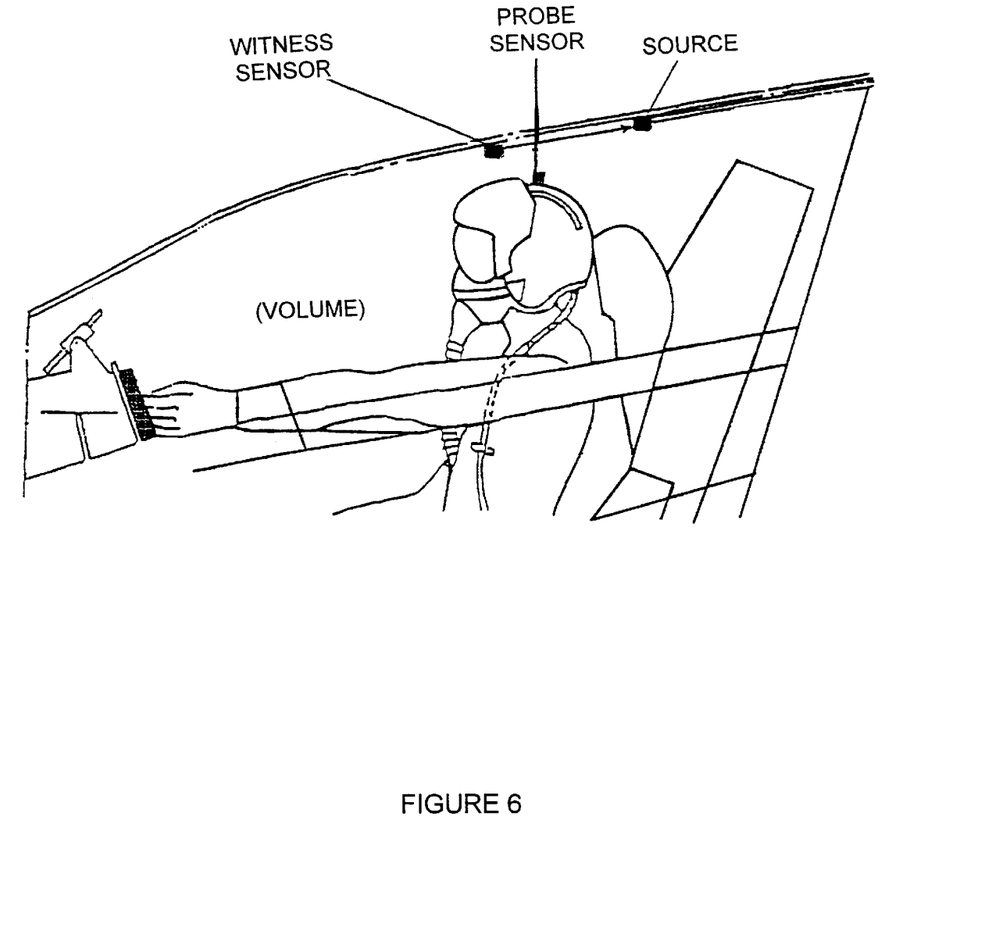
FIG. 6 illustrates the location of components in a vehicle/aircraft cockpit configuration.

In addition to trackers for helmet-mounted displays in aircraft, tank, and armored-vehicle applications (FIG. 6), the invention finds utility in any electromagnetic tracking system which might be subject to electromagnetic distortion or interference. Such application areas include electromagnetic motion capture systems, and medical systems and instruments, among others.

DETAILED DESCRIPTION OF THE INVENTION

Commonly assigned U.S. patent application Ser. No. 09/215,052 describes a position and orientation tracking system which, according to a preferred embodiment, uses Green's functions as part of a field mapping scheme which enables an electromagnetic field in a bounded volume to be determined without actual measurements inside the volume.

The invention described herein builds upon, and extends, position and orientation tracking technology through the use of a probe sensor in the form of an object having a known distortion profile at a given frequency. By performing measurements of the normal to the surface components of the electromagnetic field in a plurality of discrete points bounding a volume of interest, we can solve for the boundary value problem and find, for example, the scalar potential of the field in the volume (see FIGS. 1 and 2).

The first measurements and computations are preferably performed before the known distorter/probe sensor has been introduced, thereby providing a background profile of the field. The measurements are repeated in real time, or quasi real time in the presence of the probe sensor. The difference between initial and ongoing solution is completely determined by the position and orientation of the probe sensor working as a known distorter.

Figure 1:
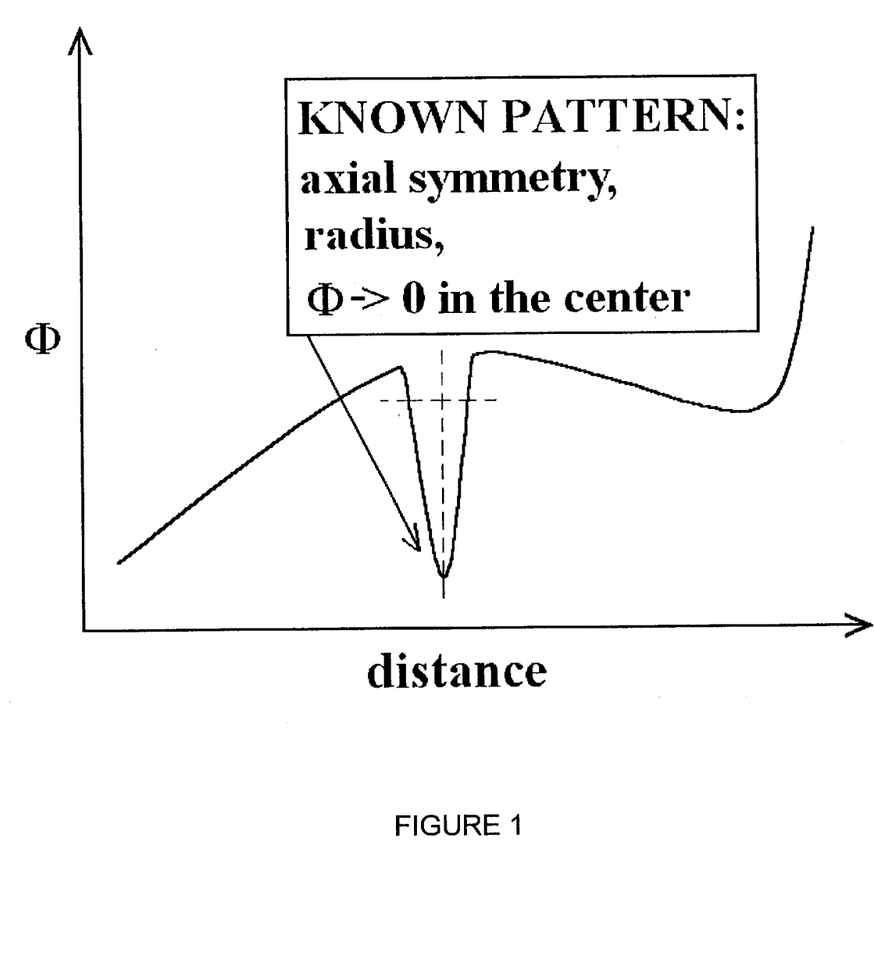
FIG. 1 is a plot of the scalar potential versus distance for a known field distorter according to the invention, namely, a ring-shaped body having a response pattern with axial symmetry such that the scalar potential $\Phi$ goes to 0 along the center.

FIG. 1 illustrates, qualitatively the change in the computed profile of scalar potential due to the introduced distortion. Mathematically, the problem is solved for the field described by the differential equation (e.g. Poisson, Laplace, Schrodinger) having the general form:

$$\Im\Phi(r)=0$$

where $\Im$ is the differential operator corresponding to the equation describing the field, and $\Phi$ is the spatially dependent characteristic of the field to be found (e.g. the scalar potential).

The solution, $\Phi(r)$, at any point r in the volume in the absence of sources of the electromagnetic field inside the volume of interest is represented in the form:

$$\Phi(r) = -\sum G(r-r')\frac{\partial \Phi(r')}{\partial n^{\varpi}}dS$$

Points r' correspond to the sensors on the bounding surface {S}, and surface elements dS correspond to the area covered by each sensor.

Values $\partial\Phi\partial n$ are acquired from surface sensors. An array of the weight functions G(r−r'), which are the Green's functions of the differential operator $\Im$, is independent of measurements and is preferably pre-computed for the given geometry of the measuring fixture.

Figure 2:
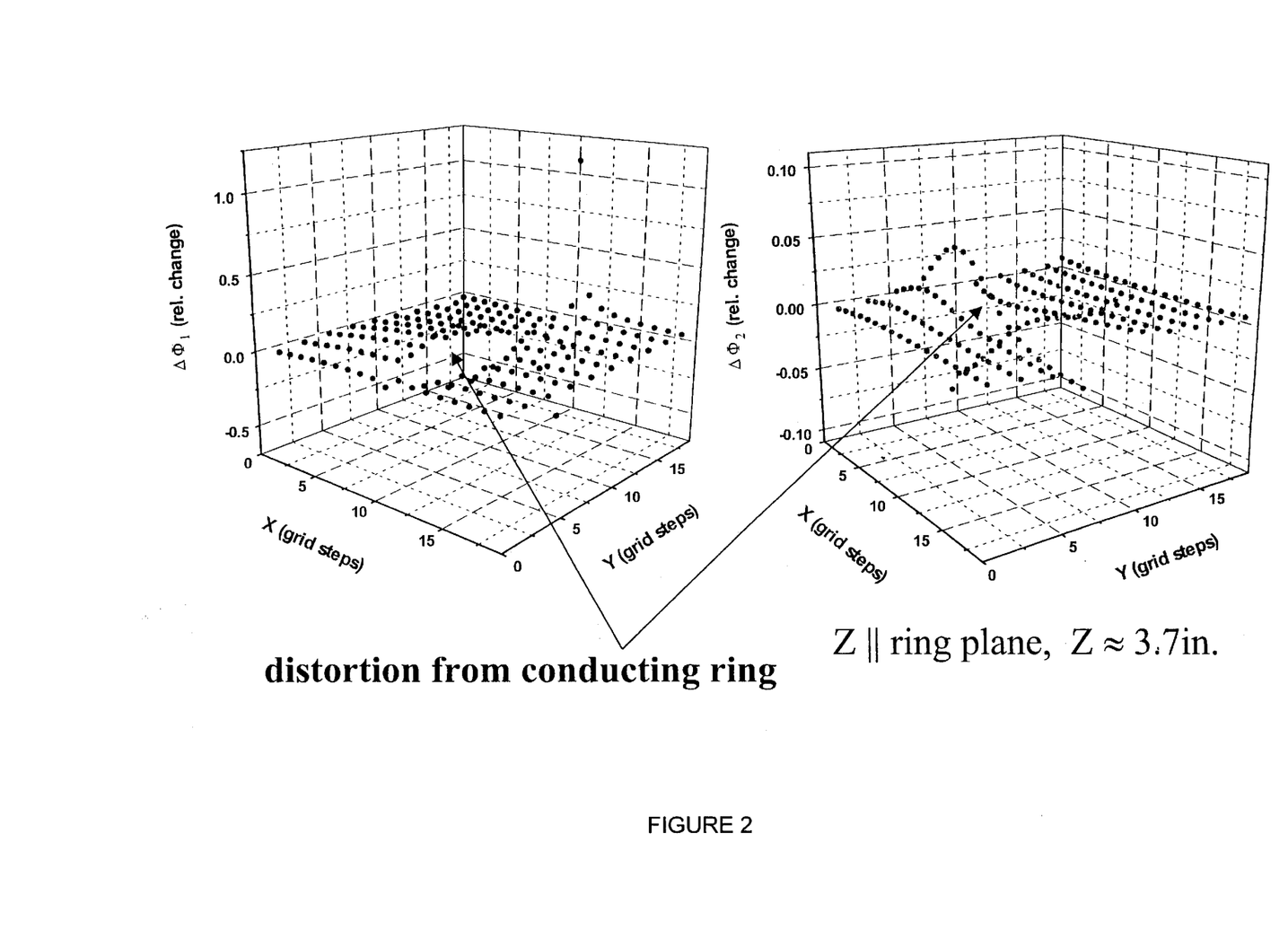
FIG. 2 presents experimental data of the relative change of the scalar potential $\Phi$ due to the distortion induced by a conducting ring for two orthogonal orientations of the source coil.

The presence of the probe sensor/source of distortion adds to the solution term:

$$\delta\Phi(r) = \sum_V G(r-r'')\rho(r'')d^3r''$$

where $\rho(r'')$ is a spatially distributed probe sensor/source function within the volume V. This term may be isolated because the solution in the absence of the distortion source is known. Since the properties of the function $\rho(r'')$ are known (this is a probe sensor), the solution of the last equation with respect to r'' may be obtained, for example, by finding the difference between the boundary value solutions with and without probe sensor using method referenced to above, or by the best-fit procedure, yielding desired position and orientation data. The results of actual physical experiment are presented in FIG. 2.

A preferred method of distortion compensation/separation according to the invention is to separate the environmental distortion signal from the probe sensor signal, for example, by shifting the phase of the signal from the probe sensor. If the probe sensor is an LC-contour (ring) tuned to the frequency of the tracker source, the signal from the probe sensor will be exactly 90° phase shifted with respect to the tracker source signal, as received by witness sensors. The rest signals, including distortion, will be phase shifted as well.

A higher Q, and accurate tuning of the probe sensor, will give a higher stability to the distortion. This may be explained as follows. Writing Ohm's law for the entire system (that is, source, distortion, witness sensor, tuned ring/probe sensor) in matrix form and solving the eigenvalue problem for the signal associated with the tuned ring we get characteristic equation:

$$\lambda^2 + \left(-i\omega L_{RING} - R_{RING} + \frac{i}{\omega C_{RING}}\right)\lambda + \omega^2(L_{RING-WITNESS}^2 + L_{RING-DIST}^2 + L_{RING-SOURCE}^2) = 0$$

where $\omega=2\pi f$ is a cyclic frequency of the source, i is an imaginary unit, and $L_{RING}$, $R_{RING}$, and $C_{RING}$ and are inductance, resistance, and capacitance of the ring, respectively. $L_{RING-WITNESS}$, $L_{RING-DIST}$, and $L_{RING-SOURCE}$ are mutual inductances between the ring and sensor, ring and distorters, and ring and tracker source.

Figure 3:
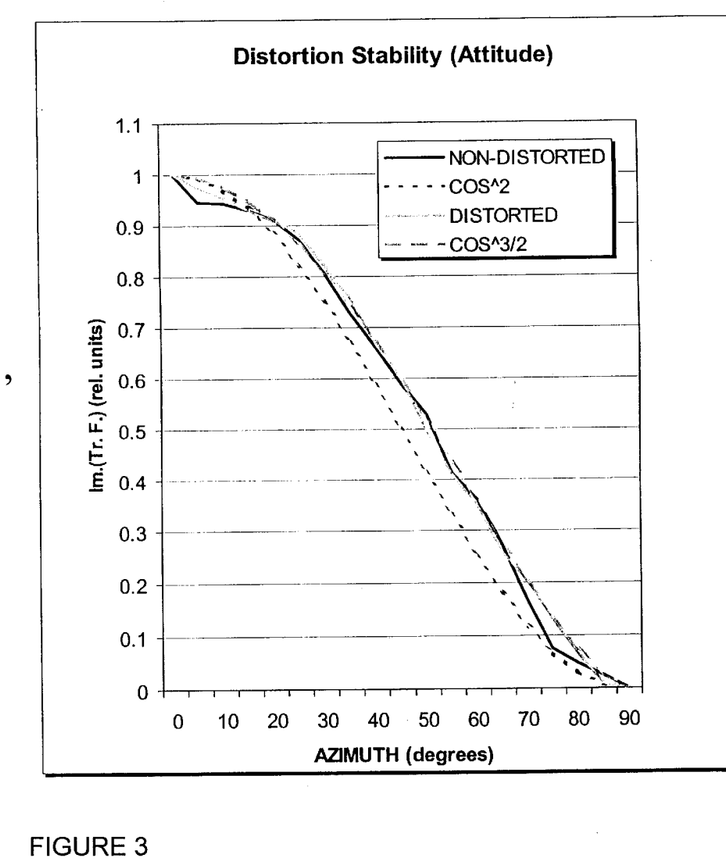
FIG. 3 is a drawing which shows a test set up of a single channel of a tracker according to the invention comprising of the source, probe sensor/ring, and sensor; plot shows distortion stability as a function of azimuth.

It will be apparent to one of skill in the art that perfect tuning i.e. $\omega=1/L_{RING} R_{RING}$), and a higher Q, the influence of the distortion is negligible. Experimental results of distortion stability are presented in FIG. 3.

Figure 4:
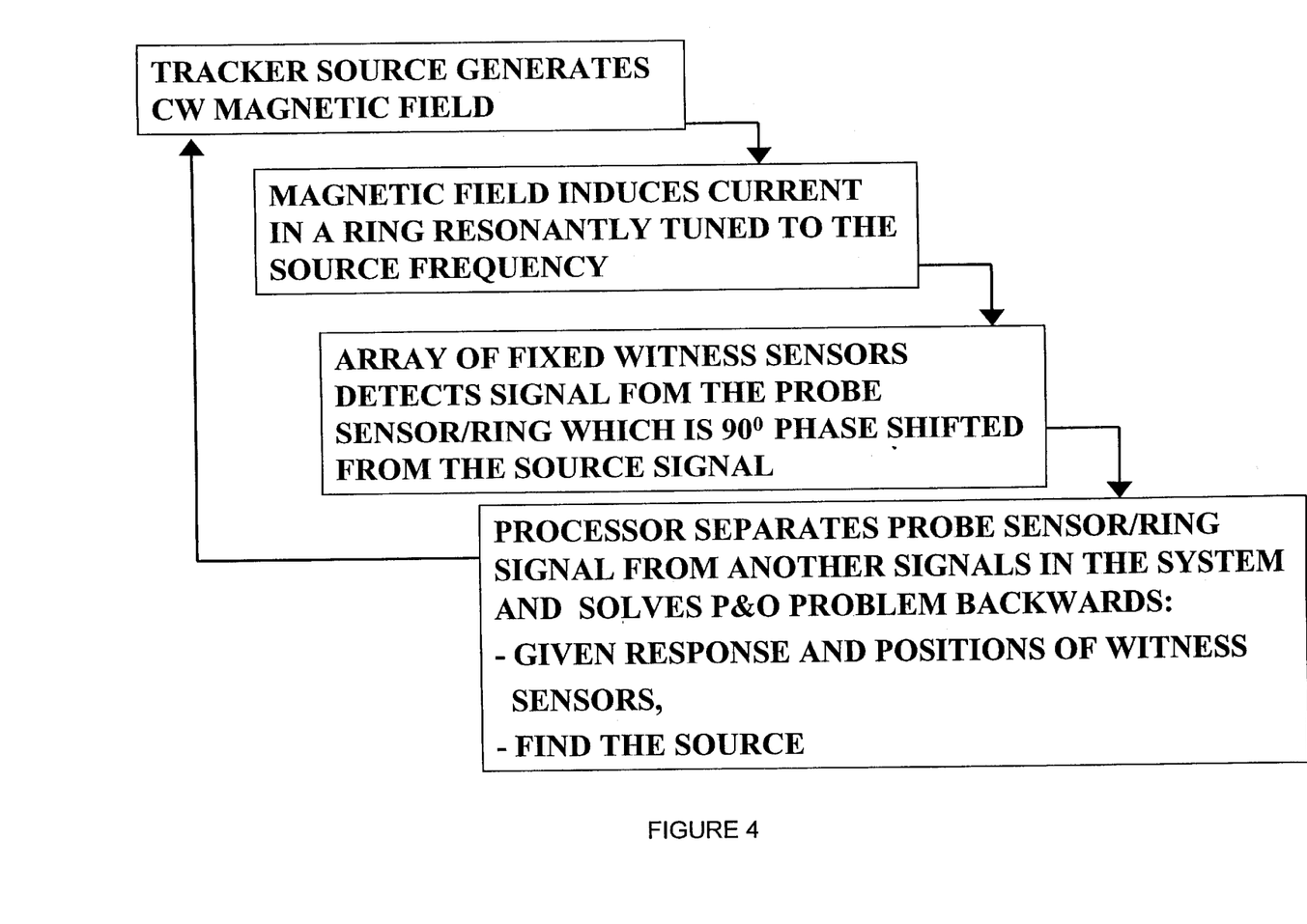
FIG. 4 is a flow diagram illustrating important steps associated with a tracking method according to the invention.

Since the resonant response has been acquired, the position/orientation solution becomes simplified as compared to the approach presented in U.S. application Ser. No. 09/430,978. A flow diagram illustrating important steps associated with a tracking method according to the invention is presented in FIG. 4.

In sum, the position/orientation algorithm according to the invention may be described as: Let $B(R_0)$ be the magnetic induction vector measured by the witness sensor at the point $R_0$, which is 90° phase shifted with respect to the "conventional" tracker. Accordingly, this field may be described by $$B(R_0) = -grad \int_V G(R_0 + r_{RING} + r)\rho(R_0 + r_{RING} + r)d^3r$$

The solution to this equation with respect to $r_{RING}$ is an output of position/orientation algorithm. Note, that if p has rotational symmetry and/or V (which the probe sensor/ring is occupied) is small, a dipole or point source approximation may be used. Multiple witness sensors increase accuracy of the solution and decrease ambiguity. If practical applications require determining 6 degrees of freedom then probe sensor may comprise of 3 LC contours tuned to 3 different frequencies and, in turn, 3 frequencies should be generated by the tracker source(s).

Figure 5:
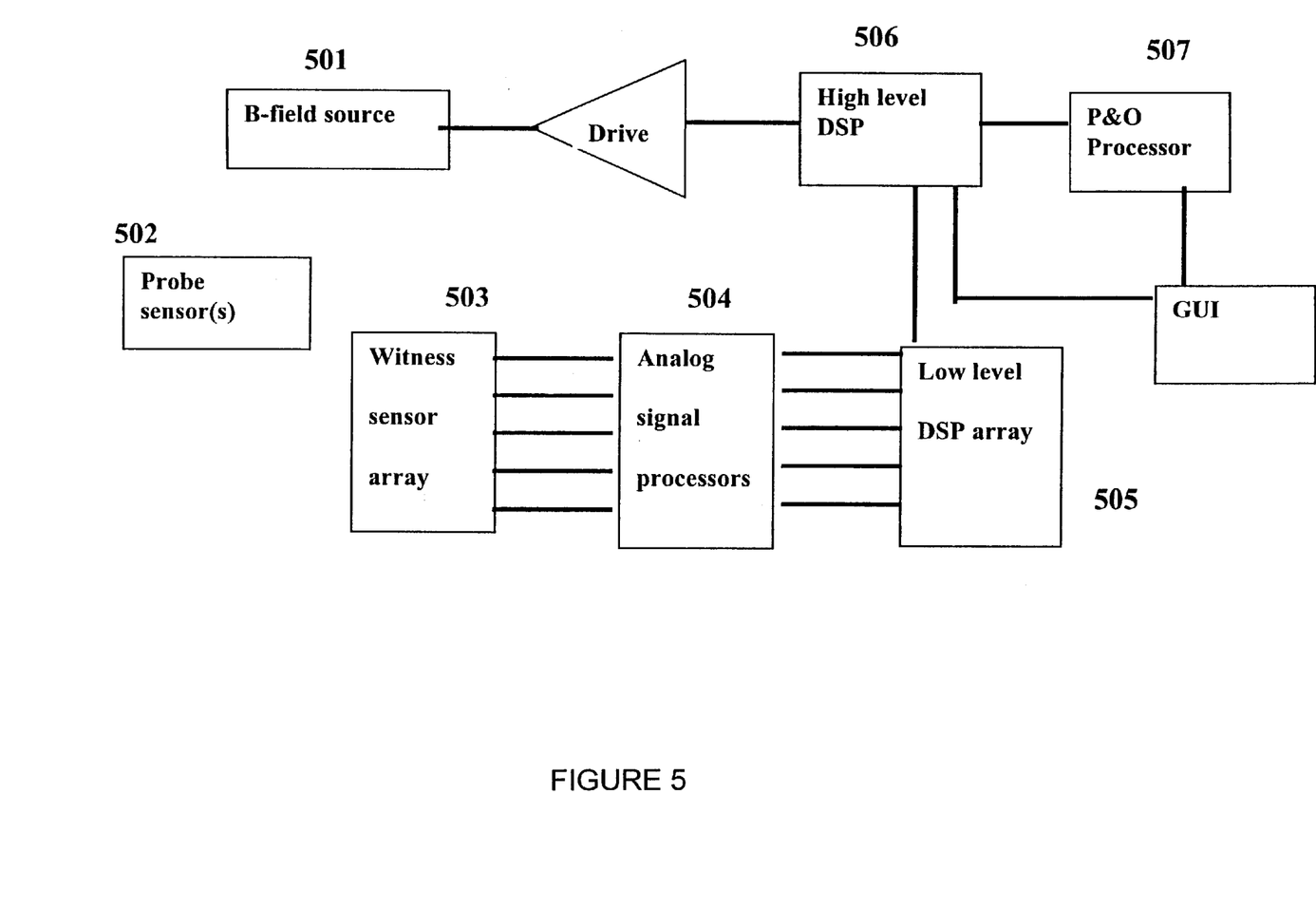
FIG. 5 is a block diagram of tracker hardware according to the invention.

An example of a tracker schematic according to the invention is shown in FIG. 5. The AC electromagnetic field source is shown generally at 501, and includes three sets of coils to produce magnetic field of three frequencies. Probe sensor 502 containing three orthogonal coils tuned to the source frequencies generate a resonant response and array of three-coil witness sensors 503 detects three components (X, Y, and Z) ob magnetic induction vector at known locations of witness sensors. Analog signal processors 504 and low level DSP array 505 processes data from witness sensors, filters it and separates probe sensor signals from the rest signals in the system. Note that, in this particular, embodiment, up to sixteen witness sensors/analog processors/low level DSPs are used, though more or fewer may readily be accommodated by the system. High level DSP 506 acquires processed data, performs system synchronization and control and passes data to the P&O processor 507, which compute position and orientation of the probe sensor(s) 502. Depending of desired speed and accuracy the functions of low level DSP array 505, high level DSP 506 and P&O processor 507 may be implemented in a single digital signal processor or a stand-alone PC.

We claim:

1. Apparatus for determining the position and orientation of an object within a volume of interest with respect to a known reference frame in the presence of electromagnetic distortion, the apparatus comprising:

a primary source of an electromagnetic field;

at least one wireless probe sensor supported on the object, the probe sensor acting as a secondary source of the electromagnetic field with a known distortion profile having measurable magnetic induction-vector components;

one or more stationary witness sensors supported near or within the volume of interest, each witness sensor being operative to detect the induction-vector components associated with each probe sensor using a fixed known position and orientation of each witness sensor; and at least one system processor in communication with each witness sensor, the processor being operative to perform the following functions:

a) distinguish the secondary source signal from the primary source signal and distortion signal, b) compute the characteristics of the secondary electromagnetic source as it seen by each witness sensor, and c) compute the position and orientation of the object given the computed characteristics of the secondary source in conjunction with the fixed position and orientation of each witness sensor in the known reference frame.

2. The apparatus of claim 1, wherein the probe sensor is an element which produces induction-vector components which are phase-shifted relative to the primary source of the electromagnetic field.

3. The apparatus of claim 2, wherein:

the primary source has a frequency associated therewith; and the element features a LC contour of a known distortion at the frequency.

4. The apparatus of claim 3, wherein the element is a conducting ring.

5. The apparatus of claim 1, wherein the object moves within the volume; and one or more of the functions performed by the processor are repeated at regular intervals to track the motion of the object.

6. The apparatus of claim 1, wherein the computed characteristics include the strength, position and orientation of the secondary source.

7. The apparatus of claim 1, wherein the volume of interest includes at least a portion of a vehicle interior, and wherein the probe sensor is supported relative to an operator of the vehicle.

8. The apparatus of claim 7, wherein vehicle interior forms part of an aircraft cockpit, and wherein the probe sensor is mounted on a helmet worn by the operator.

9. The apparatus of claim 1, wherein the secondary source is treated as a point source.

10. The apparatus of claim 1, wherein the secondary source is approximated as a dipole source or sources.

11. The apparatus of claim 1, wherein each witness sensor measures three components of the induction vector along three orthogonal axes.

12. Apparatus for determining the position and orientation of an object within a volume of interest with respect to a known reference frame in the presence of electromagnetic distortion, the apparatus comprising:

a primary source of an electromagnetic field having a frequency associated therewith;

at least one probe sensor element supported on the object, the element having an LC contour tuned to the frequency of the primary source, enabling the element to function as a secondary source having a known distortion profile with measurable magnetic induction-vector components that are phase-shifted relative to the primary source of the electromagnetic field;

one or more stationary witness sensors supported near or within the volume, each witness sensor being operative to detect the induction-vector components associated with each probe sensor element using a fixed position and orientation in a known reference frame; and a processor in communication with each witness sensor, the processor being operative to perform the following functions:

a) distinguish secondary source signal from the primary source signal and distortion signal, b) compute the characteristics of the secondary electromagnetic source as it seen by each witness sensor, and c) compute the position and orientation of the object given the computed characteristics of the secondary source in conjunction with the fixed position and orientation of each witness sensor in known reference frame.

13. The apparatus of claim 12, wherein the element is a ring.

14. The apparatus of claim 12, wherein the object moves within the volume; and one or more of the functions performed by the processor are repeated at regular intervals to track the motion of the object.

15. The apparatus of claim 12, wherein the computed characteristics include the strength, position and orientation of the secondary source.

16. The apparatus of claim 12, wherein the volume includes at least a portion of a vehicle interior, and wherein the probe sensor is supported relative to an operator of the vehicle.

17. The apparatus of claim 16, wherein vehicle interior forms part of an aircraft cockpit, and wherein the probe sensor is mounted on a helmet worn by the operator.

18. The apparatus of claim 12, wherein the secondary source is approximated as a point or dipole source or sources.

19. The apparatus of claim 12, wherein each witness sensor measures three components of the induction vector along three orthogonal axes.

20. A method of determining the position and orientation of an object within a bounded volume in the presence of electromagnetic distortion, comprising the steps of:

a) generating a primary electromagnetic field from a stationary source at a frequency;

b) providing a probe sensor on the object having a known distortion profile at the frequency which generates a secondary electromagnetic field with measureable magnetic induction-vector components;

c) placing a witness sensor at one or more stationary points near or within the volume, each witness sensor being operative to detect the magnetic induction-vector components of the secondary field;

d) computing the characteristics of the secondary electromagnetic source with respect to each witness sensor, and e) computing the position and orientation of the object given the computed characteristics of the secondary source in conjunction with the fixed position and orientation of each witness sensor relative to the stationary source.

21. The method of claim 20, wherein:

steps d) and e) are performed prior to step b) to compute a background profile of the primary field; and steps d) and e) are repeated at regular intervals following step b) to track the motion of the object.

22. The method of claim 20, wherein the step of computing the characteristics of the secondary electromagnetic field include computing the strength, position and orientation of the field.

23. The method of claim 20, wherein the object is positioned within a vehicle interior.

24. The method of claim 20, wherein the object is supported on the body of an individual.

25. The method of claim 20, further including the step of approximating the secondary source as a point or dipole source or sources.

26. The method of claim 20, wherein three components of the induction vector are measured at each stationary point.

* * * * *